(12) United States Patent
Burkhard et al.

(10) Patent No.: US 7,317,167 B2
(45) Date of Patent: Jan. 8, 2008

(54) WEIGHING MODULE WITH PRECISELY-POSITIONABLE OVERLOAD PROTECTION DEVICE

(75) Inventors: Hans-Rudolf Burkhard, Wila (CH); Andreas Metzger, Mannedorf (CH); Peter Schilling, Siebnen (CH)

(73) Assignee: Mettler-Toledo AG, Greifensee (CH)

( * ) Notice: Subject to any disclaimer, the term of this patent is extended or adjusted under 35 U.S.C. 154(b) by 179 days.

(21) Appl. No.: 11/164,869

(22) Filed: Dec. 8, 2005

(65) Prior Publication Data

US 2006/0289207 A1 Dec. 28, 2006

(30) Foreign Application Priority Data

Dec. 14, 2004 (EP) .................................. 04106570

(51) Int. Cl.
*G01G 21/00* (2006.01)
*G01G 7/02* (2006.01)
(52) U.S. Cl. ..................... 177/184; 177/187; 177/212; 177/210 EM
(58) Field of Classification Search ........... 73/862.637, 73/862.53; 177/184–189, 212, 210 EM
See application file for complete search history.

(56) References Cited

U.S. PATENT DOCUMENTS

| 3,354,710 A | 11/1967 | Johnson |
| 3,973,637 A | 8/1976 | Kunz |
| 4,254,841 A | 3/1981 | Loskill |
| 4,273,203 A | 6/1981 | Blawert et al. |
| 4,566,548 A | 1/1986 | Sodler et al. |
| 4,574,898 A | 3/1986 | Freeman |
| 4,726,435 A | 2/1988 | Kitagawa et al. |
| 5,096,007 A | 3/1992 | Burkhard |
| 5,191,948 A | 3/1993 | Strickler |
| 5,604,334 A | 2/1997 | Luchinger et al. |
| 5,721,398 A | 2/1998 | Balsen et al. |

(Continued)

FOREIGN PATENT DOCUMENTS

DE 297 02 954 U1 12/1997

(Continued)

*Primary Examiner*—Randy W Gibson
(74) *Attorney, Agent, or Firm*—Standley Law Group LLP

(57) ABSTRACT

A weighing module 1 has a force-transmitting linkage 13 arranged between the load-receiving portion 3 of the weighing cell 2 and the load receiver 5, with an overload protection device that precisely maintains its position being an integral part of the force-transmitting linkage 13. By means of a positioning element 7, 107, 207, the load receiver 5 is positioned without play relative to the load-receiving portion 3 in the plane that extends orthogonal to the load direction, and the load receiver 5 is also guided in the load direction without play. When forces in excess of the pre-tension force of the elastic element 8 act on the load receiver 5, the latter has the capability of being displaced in the load direction and to tip in all directions that are orthogonal to the load direction. The housing part 18 serves to delimit at least the range of linear downward deflection as well the tipping movement of the load receiver 5 when the load receiver 5 is exposed to transverse forces and to overloads. The rotation constraint 20 is rigidly connected to the load receiver 5 and engages a housing-connected recess 21. To position the load receiver 5 relative to its operating environment, a positioning device 16 is provided, whose central longitudinal axis coincides with the central longitudinal axis of the load receiver 5.

30 Claims, 5 Drawing Sheets

U.S. PATENT DOCUMENTS 6,232,567 B1 * 5/2001 Bonino et al. ....... 177/210 EM
6,340,799 B1    1/2002 Hama et al.
6,354,159 B2    3/2002 Burkhard et al.
6,633,008 B2   10/2003 Johnson
6,958,453 B2   10/2005 Burkhard
7,244,896 B2 * 7/2007 Honda et al. ................ 177/199

FOREIGN PATENT DOCUMENTS

DE    298 22 663 U1    8/1999
JP    61-278719        12/1986

* cited by examiner

WEIGHING MODULE WITH PRECISELY-POSITIONABLE OVERLOAD PROTECTION DEVICE

TECHNICAL FIELD

The present invention relates to a weighing module that is equipped with a precisely position-maintaining overload protection device arranged between the weighing cell and the load receiver.

BACKGROUND OF THE ART

The present invention relates to a weighing module that is equipped with a precisely position-maintaining overload protection device arranged between the weighing cell and the load receiver.

An overload protection device in a balance has the function of uncoupling the load receiver, specifically the weighing pan, from the weighing cell when a maximum permissible load is exceeded, with the force vector of the load acting on the weighing pan in a largely vertical direction. As a result, the weighing cell is protected from the consequences of excessive primarily vertical forces which can be generated either statically by a weight that exceeds a maximum permissible load, or dynamically, for example if a load is set down too rapidly. However, it is also possible for the load receiver to be exposed to transverse forces which in the absence of provisions for uncoupling can be passed on through the force-transmitting linkage to the weighing cell where they can cause damage to the sensitive weighing cell mechanism.

An overload protection device of this kind for a precision balance is disclosed in commonly-owned U.S. Pat. No. 3,973,637, where the weighing pan is configured in two parts. The pan receiving the materials to be weighed lies on a bottom part made of light sheet metal; the bottom part has an outer ring ending only a few millimeters above the housing surface of the balance. Centered in the outer ring, a hollow bolt with a collar resting loosely on the bottom part is engaged with play in a bore hole. A safety ring is imbedded on the shaft of the hollow bolt. Further, a leaf spring of star-shaped configuration is held captive between the safety ring and the bottom part, wherein the leaf spring with the ends of its arms pushes the bottom part upwards against the collar of the bolt. The bias tension of the star-shaped leaf spring is of such a magnitude that the force exerted by the bias tension on the bottom part is larger than the specified maximum load of the precision balance. Consequently, during weighing activities within the weighing range of the balance, the bottom part is held in compressive contact against the collar, while the spring exerts no influence on the weighing result. When an eccentric load is applied to the weighing pan, in particular a load which, in addition to being eccentric, exceeds the weighing range of the balance, the weighing pan can tip on the side of the load and its bottom part comes into contact with the balance housing. As a result, damage to mechanical elements of the weighing cell is avoided, for example to the legs and guide members of the parallelogram mechanism, flexure pivots, etc. This device, which belongs to the known state of the art, meets its purpose as long as the overload acts on the weighing pan substantially in the loading direction. A force that is applied at a right angle, or nearly at a right angle, to the loading direction is not absorbed by the spring-protected support of the weighing pan, but is introduced directly into the force-transmitting linkage and transmitted to the sensitive weighing cell mechanism.

Disclosed in German Gebrauchmuster 297 02 954 U1 is an overload safety device for the weighing pan of a top-loading balance. The device has a pre-tensioned compressive spring which within the permissible weighing range connects the weighing pan in a play-free and quasi-rigid manner to the load receiver of the weighing system and which yields elastically when the permissible weighing range is exceeded. A conically configured compressive contact element and a correspondingly shaped part cooperate to create a connection between weighing pan and load receiver that ensures stability against tipping and is in addition free of play within the permissible weighing range.

In commonly-owned U.S. Pat. No. 5,604,334, a precision balance is disclosed whose load receiver is connected by way of the force-transmitting linkage to the load-receiving portion of the weighing cell with relative mobility between the load receiver and the load-receiving portion. The load receiver spans across the load-receiving potion of the weighing cell like a yoke and rests on the ends of two arms which form the force-transmitting linkage and have guided mobility, pre-tensioned by a spring. Forces that are introduced into the weighing pan eccentrically or at an oblique angle cause a tilting of the load receiver which through its downwardly protruding support legs rests on the force-transmitting linkage that elastically yields in the overload range. However, the disclosed embodiment of this overload protection device can absorb only those transverse forces that are applied from either side, but not from the front or back. When transverse forces are applied from the front or back, the weighing pan is not displaced; rather, the pin connection at the front side of the weighing pan transmits the transverse forces directly to the weighing cell mechanism. As this overload safety device is normally used in balances with a draft-protection arrangement, the loading of the weighing pan occurs from the side. Consequently, one can expect transverse forces to be directed primarily from the sides.

Disclosed in Japanese 2564791 B2 is a force-measuring device which has a weighing cell with a load-receiving portion and a stationary portion, a load receiver, and a force-transmitting linkage arranged between the load receiver and the load-receiving portion. An overload protection device with an elastic element pre-tensioning the load-receiver against the load-receiving portion is integrated in the force-transmitting linkage to protect the weighing cell from being overloaded by static and dynamic forces. Thus, in case of overload and/or with the occurrence of transverse forces, the arrangement of the elements as described in this patent will likewise allow an elastic yielding of a spring device or a guided movement towards a stop that is in fixed connection with the housing. As a first disadvantage of this configuration, with large transverse forces the force-transmitting linkage due to its guided displacement will bear against the housing-based stop and the transverse forces are transmitted to the weighing cell mechanism as tensile or compressive forces. In some applications, a second disadvantage of the disclosed embodiment lies in the lack of a coaxial alignment of the axis of the force-transmitting linkage with the axis of the bore hole located in the load-receiving portion of the weighing cell, surrounding the force-transmitting linkage. Necessarily, the bore hole must have sufficient play relative to the force-transmitting linkage in order to allow a displacement of the force-transmitting linkage in the manner discussed above. As a third disadvantage, this design is not suitable to uncouple the weighing cell from tensile forces that may act on the load receiver against the load direction.

It is often necessary to attach to the load receiver a setup that is adapted to the specific application. To meet the stringent requirements in regard to the reproducibility of a weighing, this setup preferably has a fixed connection to the load receiver. However, in this kind of a situation it will be necessary to protect the weighing cell against damage that may result from torques acting at a right angle to the force being applied, which may be caused, for example, by forces acting tangentially on the load receiver. These kinds of forces occur particularly in cases where the possibility is provided to attach a setup on top of the load receiver with a screw connection, in particular a weighing pan or an adapter. An overload protection device of this kind for a force-measuring device is disclosed in commonly-owned U.S. Pat. No. 6,958,453 B2.

In integral automated production and test systems, it is particularly suitable to incorporate balances of a modular design, so-called weighing modules. This term applies essentially to balances in which the indicator unit is arranged separately from the balance, as for example in a system with a central indicator for a plurality of weighing modules. Integrated weighing modules of this kind are used with preference in systems for the production and testing of small, expensive parts, for example in filling and packaging machines for tablets, ampoules, capsules, etc. in the pharmaceutical industry or in the quality control of ball bearings.

To allow a plurality of parallel weighings of individual masses of weighing objects of the same kind, a solution presents itself in the form of two-dimensional matrix-like array of weighing modules arranged in a compact space. Given that a handling device is used, for example a robot arm with multiple gripping devices, to put these weighing objects in parallel on the individual load receivers of the weighing modules and to remove them again from the load receivers after the weighing process, the positions of the individual load receivers have to be precisely defined in relation to each other and to the handling device. During the weighing activity, the load receivers have to be held without change in their positions at least within a plane that runs orthogonal to the direction of the load. In the case where the load-handling is performed by a robot arm, a malfunction in the handling device can cause an overload, tensile force or transverse load to act on the load receivers in any direction, and this can have an adverse effect on the weighing performance. Among the current state of the art, no solution is known which would have the required configuration for this area of application.

It is therefore an object of the present invention to propose a weighing module whose overload protection device uncouples from the weighing cell at least one overload in the load direction as well as transverse forces orthogonal to the load direction. In addition torques due to the installation or and/or un-installation of load receivers on the force-transmitting linkage should be uncoupled as well. In order to allow the weighing processes to continue immediately after the overload protection device has been activated due to the application of additional forces, it needs to be ensured that the load receiver returns to the original position after the forces have subsided. The weighing module which is mounted on a weighing module support must not change its place relative to the latter in spite of transverse forces occurring on the load receiver. In addition, suitable means are to be provided to facilitate the precise positioning of the weighing module at its location of use prior to installation, to prevent the need for adjustments associated with the installation of the weighing module at the location of use.

SUMMARY OF THE INVENTION

According to the invention, the foregoing object is accomplished with a weighing module according to the appended claims.

The weighing module according to the invention, which has a weighing cell with a load-receiving portion and a stationary portion, a load receiver, and a force-transmitting linkage arranged between the load receiver and the load-receiving portion, is equipped with an overload protection device that is incorporated in the force-transmitting linkage and serves the function to protect the weighing cell from being overloaded by static and dynamic forces. The overload protection device comprises a fixating member and a positioning element which precisely positions the load receiver in relation to the load-receiving portion in a plane that is orthogonal to the load direction, wherein the flow of the force in the load direction from the load receiver to the load-receiving portion is transmitted through an elastic element. As a result, the load receiver has the ability to be displaced in the load direction by forces that exceed the bias-tension force of the elastic element, and to tilt in all directions in the presence of forces orthogonal to the load, due to a position-release feature that is formed between the positioning element and the load-receiving portion. Depending on the design of the overload protection device, forces which act on the load receiver in the opposite sense of the load direction are likewise uncoupled from the weighing cell.

To allow the weighing module to be installed in place with a precise fit and to be firmly secured in its location, one has to provide a device for positioning the weighing module, wherein the position of the positioning device itself has a specific spatial relationship to the position of the load receiver. Ideally, the load receiver and the positioning device of the weighing module are arranged on the same longitudinal central axis. This makes it possible in arrangements of multiple weighing modules to precisely define the positions of the individual load receivers relative to each other through the whole pattern of the weighing module support, with the actual position of the weighing module on the plane orthogonal to the central longitudinal axis being irrelevant. The term "hole pattern" means an arrangement of holes in a body, for example a plate, that are defined in their geometric relationships relative to each other. In addition to the simplicity of positioning and installing the weighing module that is equipped with a positioning device, the central longitudinal axis of the weighing module is not displaced relative to its surroundings when transverse forces occur, because the central longitudinal axis is determined by the positioning device of the weighing module providing a form-fitting connection to the surrounding structure of the weighing module, in particular to the weighing module support.

In the present context, the term "load receiver" should be understood to mean any kind of device that receives the weighing object for the purpose of carrying out a weighing. This also includes in particular a load-receiving platform which may include provisions for attaching an accessory setup, or it can also mean a weighing pan. It is likewise possible that an additional accessory setup or adapter is arranged on the load receiver itself.

With respect to the function of the overload protection device, it is irrelevant whether the positioning element is in fixed connection with the load receiver or the fixating member, and whether the counterpart of the positioning element, for example a sleeve, is in fixed connection with the fixating member or the load receiver, respectively. With either configuration, the positioning element positions the sleeve without play in the plane that runs orthogonal to the load direction, and guides the sleeve in a play-free displacement in the opposite and/or the same direction in which the load is directed. When an overload occurs in the load direction, the load receiver moves into contact with a housing part, while in the case of transverse forces orthogonal to the load direction, the load receiver has the ability to tilt in all directions.

In a first embodiment of the invention, the inventive weighing module, which has a weighing cell with a load-receiving portion and a stationary portion, a load receiver, and a force-transmitting linkage arranged between the load receiver and the load-receiving portion, is equipped with an overload protection device that is incorporated in the force-transmitting linkage and serves the function to protect the weighing cell from being overloaded by static and dynamic forces. The overload protection device comprises a sleeve, a form-molded body and an elastic element, where the elastic element pushes the displacement-stopping portion of the form-molded body into contact with the displacement-stopping area of the sleeve and thereby biases the load receiver with a pre-tension against the load-receiving portion. The sleeve is guided in the load direction without play by means of the form-molded body and positioned in the working position of the load receiver. As a result, when forces are present that exceed the pre-tensioning force of the elastic element, the load receiver is able to slide in the load direction and to tilt in all directions that are orthogonal to the load direction. A stop formed inside the sleeve has a ring-shaped surface or line extending at a right angle to the load direction, while a positioning element with a counter-stop having at least three resting points directed against the stop is either attached to or formed on the load receiver or on the fixating member. The largest dimensions of the positioning element perpendicular to the load direction in the area of at least three contact points are substantially equal to the dimensions, preferably the internal diameter, that the sleeve has in these areas. As a practical matter, the sleeve is designed with rotational symmetry, with the inside wall of the sleeve having either a cylindrical shape or any desired shape, contour or profile, particularly in the area of the positioning element, in order to achieve a sufficient clearance space for the position-release feature.

In a second embodiment of the invention, the positioning element is arranged so that the lengthwise central axes of the fixating member, the positioning element and the load receiver, which run in the direction in which the force is introduced into the weighing cell, coincide with each other. The positioning element is preferably designed with rotational symmetry, in a frusto-conical shape, with the at least three resting points of the counter-stop serving as the base.

In a third embodiment of the invention, the three resting points of the counter-stop lie on a circular ring surface or a circular ring line. With preference, the elastic element arranged in the area of the force-transmitting linkage is constituted as a compressive helix spring.

In a fourth embodiment of the invention, the overload protection device can also uncouple tensile forces acting on the load receiver from the load-receiving portion of the weighing cell, due to a design in which the overload protection device is supplemented with a linear guide and a spring element. In this embodiment, the restoring force of the elastic element, as well as the restoring force of the spring element, are individually adjustable, and in the load direction, the position of the load receiver in relation to the load-receiving portion is defined by stops.

In fifth embodiment of the invention, the elastic element is arranged and configured in a way that enables it to act in the load direction as well as against the load direction. In the no-load condition, the elastic element thus defines the position in the load direction for the load receiver relative to the load-receiving portion. The play-free positioning in the plane orthogonal to the load direction is assured by the positioning element. The elastic element is no longer adjustable.

In a sixth embodiment of the invention, elastic properties are added to the positioning element so that the latter replaces the elastic element. In the non-loaded condition, the positioning element positions the load receiver in relation to the load-receiving portion of the weighing cell without play in three dimensions. The elastic element is no longer adjustable.

In a preferred embodiment of the invention, there is a structural part rigidly connected to the housing of the weighing module, preferably to its floor part, which structural part has a housing-based stop which delimits the linear movement and the displacement of the load receiver.

With preference, a rotational constraint is added to the overload protection device against excessive forces acting perpendicular to the load direction, particularly forces meeting the load receiver tangentially, with the rotational constraint engaging a housing-based contour that sets the rotation limits, for example a recess or groove. The means for limiting a rotation of the load-receiving portion relative to the stationary portion have the effect that in the installation, particularly when bolting an accessory setup onto the load receiver, the weighing cell does not get irreversibly deformed by lateral forces as a result of an excessive torque which would be coupled to the weighing cell through the elastic element. An irreversible deformation of this kind in the weighing cell would manifest itself at least through errors in the weighing result, and in the worst case through the destruction of the weighing cell. If the elastic element is arranged so that no torques can be transmitted to the load-receiving portion, the load receiver needs to be capable of counteracting the applied torque when an accessory setup is bolted onto the load receiver. In order to avoid the need for additional tools such as for example a wrench, the rotation constraint according to the invention can also be used as a counter-holding device in the installation and un-installation of an accessory setup. A variety of geometrical shapes are suitable as rotation delimiters with the capability to absorb torques through form-fitting contact with a corresponding housing-based contour or recess. The simplest way of realizing this concept is with a pin that is arranged rigidly on the load receiver at a right angle to the load direction and engages a housing-based recess. The recess in the housing needs to have sufficient play relative to the rotation constraint so that when the load receiver is in operating position, the rotation constraint and the housing-connected recess will not touch each other while allowing the load receiver to tilt to all sides from the operating position. Ideally, the first end of the elastic element is rigidly connected to the fixating member and the second end is rigidly connected to the load receiver. This has the effect that when a torque is applied, the elastic element generates a counter-torque whose magnitude is limited by the play that exists between the recess in the housing and the rotation constraint. After the torque on the load receiver has ceased to exist, the counter-torque returns the rotation constraint back to its original position. With this measure, a largely contact-free position of the rotation constraint is achieved relative to the housing-connected recess when the load receiver is in the operating position.

In a further developed embodiment of the invention, the weighing module has a structural part, in particular a floor part, that is rigidly connected to the stationary part of the weighing cell and is also rigidly connected to a positioning device. The positioning device can in this case be designed in a variety of ways, for example in the shape of a cylindrical or barrel-shaped form-fitting pin, a conical pin or a sphere. This form-fitting positioning device which is effective in at least two dimensions can be designed with or without a detent element. Guide portions with selectable cross-sections such as dovetail guides and the like can likewise be used for the positioning of the weigh module.

In a preferred further developed embodiment of the invention, the positioning device is arranged so that the central lengthwise axes of the positioning device and the load receiver which run in the direction in which the load is introduced into the weighing cell coincide with each other.

In a particularly preferred embodiment, the positioning device and possible further fastening areas of the weighing module are equipped with means, preferably raised pad surfaces, to distance the housing of the weighing cell, in particular the floor part, from the weighing module support, so that surface irregularities and deformations of the weighing module support are not transferred to the weighing module and are prevented from negatively affecting the weighing result.

BRIEF DESCRIPTION OF THE DRAWINGS

Details of the weighing module according to the invention with an overload protection device and a positioning device are presented in the description of the exemplary embodiments that are illustrated in the drawings, wherein.

DETAILED DESCRIPTION OF A PREFERRED EMBODIMENT

Figure 1:
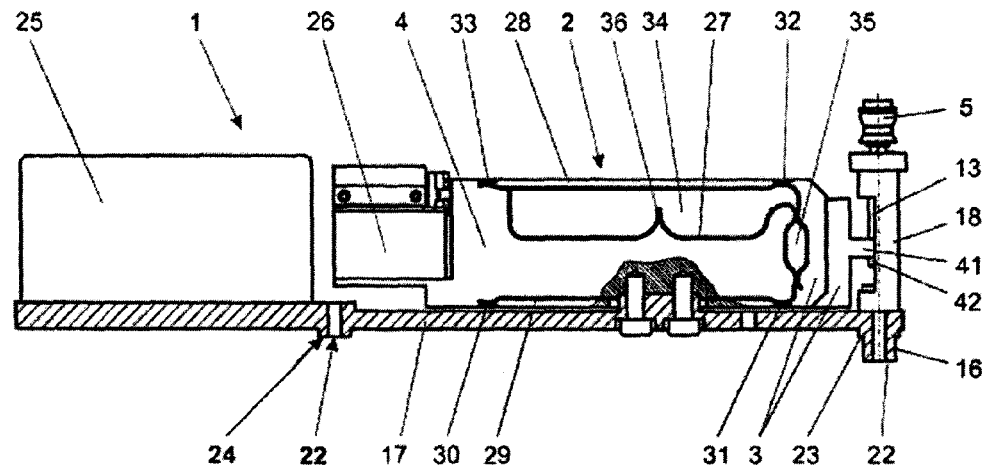
FIG. 1 depicts a weighing module from which the upper part of the housing has been removed, with an overload protection device and a positioning device in accordance with the invention.

FIG. 1 illustrates a weighing module 1 from which the housing top has been removed. Installed on a floor part 17 are a weighing cell 2 with its force-compensation device 26, and the signal-processing module 25. The weighing cell 2 includes a force-transmitting mechanism formed out of a monolithic, substantially brick-shaped material block in which distinct material portions are separated from each other by material-free spaces in the form of narrow linear cuts 27 traversing the material block perpendicular to the plane of its largest lateral surfaces. The material portions form a parallelogram with an upper parallelogram guide 28 and a lower parallelogram guide 29, one parallelogram leg forming a stationary portion 4, and a vertically displaceable parallelogram leg forming the load-receiving portion 3. The parallelogram legs 3, 4 and the parallelogram guides 28, 29 are connected to each other through flexible connecting portions 30, 31, 32, 33 which are of a concave shape, delimited by material-free spaces. Further material portions in the interior of the material block form a force-transmitting lever 34. The stationary portion 4 of the weighing cell 2 is rigidly connected to the floor part 17.

The load-receiving portion 3 is connected to the short lever arm of the force-transmitting lever 34 through a coupling element 35 that can bend elastically while being stiff against elongation. The force-transmitting lever 34 is supported though a fulcrum flexure 36 on a part of the stationary portion 4 that reaches out into the interior of the material block. This design arrangement for a force-transmitting device has the advantage of mechanical rigidity combined with a compact volume. The parallelogram 3, 4, 28, 29, the coupling element 35, as well as the force-transmitting lever 34 and the fulcrum flexure 36 are delimited by material-free space in the form of narrow linear cuts 27. The narrow linear cuts 27 are made preferably by means of electrical discharge machining with an erosion wire. The force compensation device 26 is coupled to the force-transmitting lever 34 through a lever extension that is not shown in FIG. 1.

A projection 41 facing to the opposite side of the stationary portion is formed at an intermediate height on the load-receiving portion. A force-transmitting linkage 13 is fastened to the projection. A force-transmitting linkage 13 is fastened to the projection 41 by means of a fastener element 42, for example screwed tight with a threaded bolt. The force-transmitting linkage extends parallel to the large side surface of the material block and orthogonal to the lengthwise direction of the parallelogram guides 28, 29. The load receiver 5 is fastened to the end of the force-transmitting linkage 13 that faces way from the projection 41. The force-transmitting linkage 13 is partially enclosed by a housing part 18.

The side of the floor part 17 that faces away from the weighing cell 2 has fastening areas 22 with seating pads 23, 24 that are raised from the floor part 17, wherein the seating pad 23 belonging to the positioning device preferably surrounds the positioning device 16. The arrangement proves to be particularly advantageous if the central lengthwise axis of the positioning device 16 coincides with the central lengthwise axis of the load receiver 5 when the latter is in its operating position. As a result, the position of the load receiver 5 is defined by the position of the positioning device 16, more specifically by the recess in the weighing module support (not shown in the drawing), preferably a bore hole, that serves to receive the positioning device 16.

Figure 2:
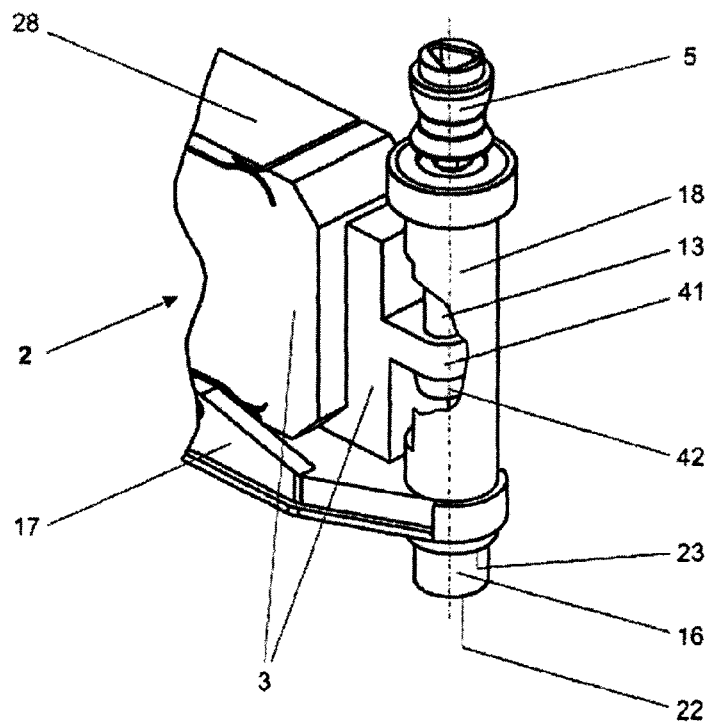
FIG. 2 is a perspective view of the anterior portion of the weighing module from which the upper part of the housing has been removed, with an overload protection device and a positioning device in accordance with the invention, without a rotation constraint.

FIG. 2 gives a perspective representation of the load receiver portion of a weighing module 1 according to the invention as viewed at an oblique angle from above. The load receiver 5 is connected to the force-transmitting linkage 13. The force-transmitting linkage 13 is rigidly coupled to the projection 41 by means of a fastener element 42. The force-transmitting linkage 13 is partially enclosed by the housing part 18. The housing part 18 serves to delimit the linear downward deflection of the load receiver 5 under an overload and simultaneously to delimit the tilting movement of the load receiver 5 that can occur as a result of transverse forces acting on the load receiver 5. The side of the floor part 17 that faces away from the load receiver 5 has a fastening area 22 with a seating pad area raised above the floor part 17, wherein the seating pad 23 area belonging to the positioning device preferably surrounds the positioning device 16. This arrangement proves to be particularly advantageous if the central lengthwise axis of the positioning device 16 coincides with the central lengthwise axis of the load receiver 5, as indicated by the dash-dotted axial line in FIG. 2. As a result, the position of the load receiver 5 is defined by the position of the positioning device 16, more specifically by the recess in the weighing module support (not shown in the drawing), preferably a bore hole, that serves to receive the positioning device 16. If the weighing module support has a plurality of recesses that are spatially interrelated, and if weighing modules 1 of the same kind are installed, their load receivers 5 will have the same spatial relationship to each other as the recesses. In the case of a rotationally symmetric positioning device 16, for example a cylindrical pin, a spherical detent, a conical peg, etc., the weighing module 1 can be secured in a freely selectable position concentrically around the weighing pan axis. This allows a very compact arrangement for a plurality of load receivers 5 relative to the two horizontal dimensions, due to the arrangement of the force-transmitting linkage 13 at the front end of the weighing module 1, the compact enclosure of the force-transmitting linkage 13 in the housing part 18, as well as the shape of the floor part 17 which at the front end of the weighing module 1 tapers down from the width of the weighing module towards the housing part 18, with the same tapered shape of the upper part of the housing (taken off and not shown in the drawing). In a weighing array that is formed in this manner, the weighing modules 1 can be arranged in a radial layout relative to the center point of the array. Of course, it is conceivable that the fastening areas 22 are arranged in analogous manner on the upper part of the housing (not shown). Ideally in this case, the positioning device 16 surrounds the force-transmitting linkage 13 like the housing part 18 or is even an integral component of the housing part 18.

Figure 3:
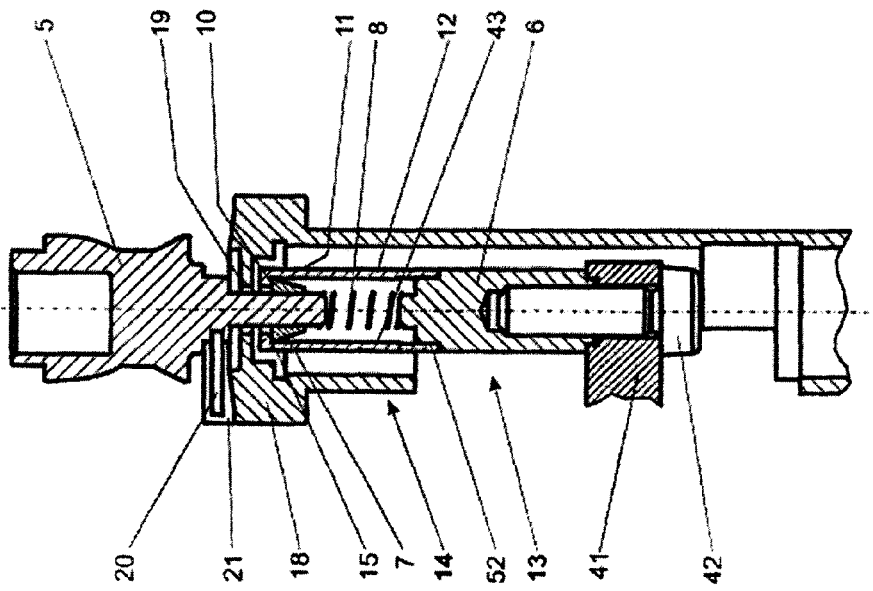
FIG. 3 is a cross-sectional view of an overload protection device in a first embodiment with the positioning element attached to the load receiver and the sleeve attached to the fixating member, also including a possible realization of the integrated rotation constraint.

FIG. 3 gives a cross-sectional view of a force-transmitting linkage 13 with an integrated overload protection device. The force-transmitting linkage 13 comprises a fixating member 6 which is rigidly connected to the projection 41 by way of the fastener element 42, preferably with a screw bolt, and further comprises a sleeve 12 which is securely attached to the fixating member 6, and the load receiver 5 whose positioning element 7 is pre-tensioned by the elastic element 8 inside the sleeve 12 against the stop 11. Preferably, the elastic element 8, which is arranged between the fixating member 6 and the load receiver 5 and whose pre-tension urges the load receiver 5 against the fixating member 6 and thus against the load-receiving portion 3, is a compressive helix spring. The stop 11 which is formed inside the upper end of the sleeve has a ring-shaped surface or line extending in a plane that is perpendicular to the load direction, while the positioning element 7 which is rigidly connected to the load receiver 5 has a counter-stop 10 directed against the stop 11, with at least three resting points formed on the counter-stop 10, wherein the largest transverse dimension of the positioning element 7 in the area of at least three contact points 15 with the inside wall 43 of the sleeve 12 is substantially equal to the internal diameter of the sleeve 12. If the positioning element 7 itself is formed with rotational symmetry, then the element referred to as sleeve 12 can of course be reduced to three contact areas, analogous to the foregoing description of the positioning element 7. In order to allow the load receiver 5 to tip in response to transverse forces acting on the load receiver 5, the space for a released position has to be provided between the sleeve 12 and the positioning element 7 on the side that faces away from the stop 11. In the illustrated arrangement, the release clearance is achieved by a frusto-conical shape of the positioning element 7 opposite a cylindrical internal wall 43 of the sleeve. With an appropriate design of the sleeve 12, for example with an adjustment screw thread 52 between the fixating member 6 and the sleeve 12, the spring force of the elastic element 8, and thus the permissible maximum load of the weighing module 1, can be adjusted. Of course, with a suitable design one can also provide the same possibility of adjustment on the part of the load receiver 5, in which case the positioning element 7 has to be moved with axial adjustability relative to the load receiver 5 and the spring 8 is pre-tensioned in accordance with the insertion depth of the load receiver 5.

A rotation constraint 20 is rigidly connected to the load receiver 5 and engages a housing-connected recess 21. The rotation constraint 20 is configured preferably as a pin and the housing-connected recess is preferably configured as a groove, but other forms of the rotation constraint 20 and the housing-connected recess 21 can also be realized, for example with a polygonal configuration surrounding the load receiver 5. The housing-connected recess 21 has sufficient play clearance relative to the rotation constraint 20 in order to allow the load receiver 5 to tip from its working position, but to keep the rotation constraint 20 and the housing-connected recess 21 as much as possible out of contact with each other when the load receiver 5 is in its working position. The first end of the elastic element 8 is rigidly connected to the fixating member 6 and the second end is rigidly connected to the load receiver 5. The housing part 18 which is solidly connected to the floor part 17 partially encloses the force-transmitting linkage 13 and is designed in such a way relative to the load receiver 5 that a housing-based stop 19 is formed which delimits the tilting movement and the downward deflection of the overload protection device or of the load receiver 5.

Figure 4:
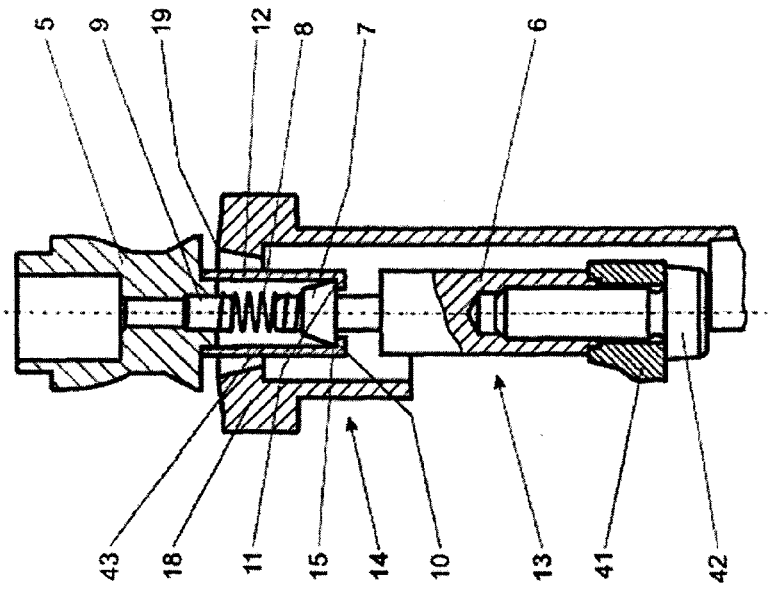
FIG. 4 is a cross-sectional view of an overload protection device in a second embodiment with the positioning element attached to the fixating member and the sleeve attached to the load receiver, without an integrated rotation constraint.

FIG. 4 shows a further embodiment of a force-transmitting linkage 13 with an integrated overload protection device in a cross-sectional view. The force-transmitting linkage 13 comprises a fixating member 6 which is rigidly connected to the projection 41 by way of the fastener element 42, preferably with a screw bolt. The positioning element 7 is either rigidly attached to, or directly formed on, the fixating member 6. The load receiver 5, which is rigidly connected to the sleeve 12 enclosing the positioning element 7, is pre-tensioned by the elastic element 8 against the fixating member 6 and thereby pushes the stop 11 into contact against the counter-stop 10. Preferably, the elastic element 8, which is arranged inside the sleeve 12 between the fixating member 6 and the load receiver 5 and whose pre-tension urges the load receiver 5 with the sleeve 12 against the fixating member 6 and thus against the load-receiving portion 3, is a compressive helix spring. The stop 11 which is formed inside the upper end of the sleeve 12 has a ring-shaped surface or line extending in a plane that is perpendicular to the load direction, while the positioning element 7 which is rigidly connected to the fixating member 6 has a counter-stop 10 directed against the stop 11, with at least three resting points formed on the counter-stop 10, wherein the largest transverse dimension of the positioning element 7 in the area of at least three contact points 15 with the inside wall 43 of the sleeve 12 is substantially equal to the internal diameter of the sleeve 12. The embodiment disclosed in FIG. 4 is shown without an integrated rotation constraint. Of course, with this variant one could likewise use a rotation constraint analogous to the concept of FIG. 3. The housing part 18 which is solidly connected to the floor part (not shown) partially encloses the force-transmitting linkage 13 and is designed in such a way towards the load receiver 5 that a housing-based stop 19 is formed which delimits the tilting movement and the downward deflection of the overload protection device or, more specifically, of the load receiver 5. In this embodiment, too, the spring force of the elastic element 8 can be adjusted either through an appropriate design of the sleeve 12 or the load receiver 5. If the load receiver 5 is designed in two parts and thus has a load receiver bolt 9, the spring force can be adjusted with a screwdriver even after the assembly of the weighing module if the end face of the load receiver bolt 9 has a groove that is accessible from above through a bore hole in the load receiver 5.

Figure 5:
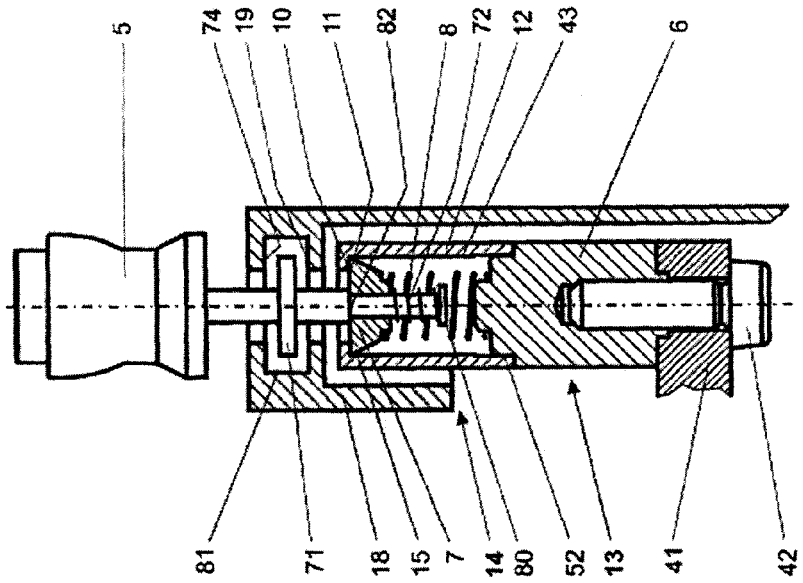
FIG. 5 is a cross-sectional view of an overload protection device in a third embodiment, which also includes the capability to uncouple tensile forces, without an integrated rotation constraint.

FIG. 5 shows a further embodiment of a force-transmitting linkage 13 with an integrated overload protection device 14 in a cross-sectional view. The force-transmitting linkage 13 comprises a fixating member 6 which is rigidly connected to the projection 41 by way of the fastener element 42, preferably with a screw bolt, and further comprises a sleeve 12 which is solidly connected to the fixating member 6, of the intermediate member 70 whose positioning element 7 is pre-tensioned by the elastic element 8 against the stop 11 inside the sleeve 12, and the load receiver 5 whose guide body 73 is pre-tensioned by the spring element 72 against the intermediate-member stop 75 inside the intermediate-member sleeve 76, the latter being rigidly connected to the intermediate member 70.

Preferably, the elastic element 8, which is arranged between the fixating member 6 and the intermediate member 70 and whose pre-tension urges the intermediate member 70 against the fixating member 6 and thus against the load-receiving portion 3, is a compressive helix spring. The stop 11 which is formed inside the upper end of the sleeve 12 has a ring-shaped surface or line extending in a plane that is perpendicular to the load direction, while the positioning element 7 which is rigidly connected to the intermediate member 70 has a counter-stop 10 directed against the stop 11, with at least three resting points formed on the counter-stop 10, wherein the largest transverse dimension of the positioning element 7 in the area of at least three contact points 15 with the inside wall 43 of the sleeve 12 is substantially equal to the internal diameter of the sleeve 12. If the positioning element 7 itself is formed with rotational symmetry, then the element referred to as sleeve 12 can of course be reduced to three contact areas, analogous to the foregoing description of the positioning element 7. In order to allow the intermediate member 70 and thus the load receiver 5 to tip in response to transverse forces acting on the load receiver 5, a exemption has to be provided between the sleeve 12 and the positioning element 7 on the side that faces away from the stop 11. In the illustrated arrangement, the release clearance is achieved by a frusto-conical shape of the positioning element 7 opposite a cylindrical internal wall 43 of the sleeve. With an appropriate design of the sleeve 12, for example with an adjustment screw thread 52 between the fixating member 6 and the sleeve 12, the spring force of the elastic element 8, and thus the permissible maximum load of the weighing module 1, can be adjusted.

Preferably, the spring element 72, which is arranged between the intermediate-member sleeve 76 and the load receiver 5, and whose pre-tension urges the load receiver 5 against the intermediate member, is a compressive helix spring. The intermediate-member stop 75 which is formed at the upper end of the intermediate member 70 and is radially confined by the intermediate-member sleeve 76 has a ring-shaped surface or line extending in a plane that is perpendicular to the load direction. The guide body 73 which is rigidly connected to the load receiver 5 has a guide-body stop 77 directed against the intermediate-member stop 75, on which at least three resting points are formed. The guide body 73 is guided inside the intermediate-member sleeve 76, where the guide body 73 which is rigidly connected to the load receiver 5 can slide only in a linear-displacement mode relative to the intermediate-member sleeve 76. In this arrangement, it is irrelevant whether the guide body 73 alone takes on the function of the linear guiding constraint or, as shown in FIG. 5, a sleeve guide 78 which is formed on the intermediate-member sleeve 75 performs part of the linear guide function. Of course, in analogy to the positioning element 7, the guide body 73 needs only three guide areas facing the intermediate-member sleeve 76. Through an appropriate design of the intermediate-member sleeve 76, for example with an adjustment screw thread 79 between the intermediate member 70 and the intermediate-member sleeve 76, it is possible to adjust the spring force of the spring element 72.

The embodiment disclosed in FIG. 5 is shown without an integrated rotation constraint. Of course, with this variant one could likewise use a rotation constraint analogous to the concept of FIG. 3. The housing part 18 which is solidly connected to the floor part (not shown) partially encloses the force-transmitting linkage 13 and is designed in such a way towards the load receiver 5 that a housing-based stop 19 is formed which delimits the tilting movement and the downward deflection of the overload protection device or of the load receiver 5. A retainer stop 74 is formed on the inside of the housing part 18, opposite a bolt collar 71. The bolt collar 71 which is rigidly connected to the load receiver 5 interacts with the retainer stop 74 to limit the range of linear motion of the load receiver 5 relative to the intermediate-member sleeve 76 when there are forces on the load receiver 5 acting against the load direction.

Figure 6:
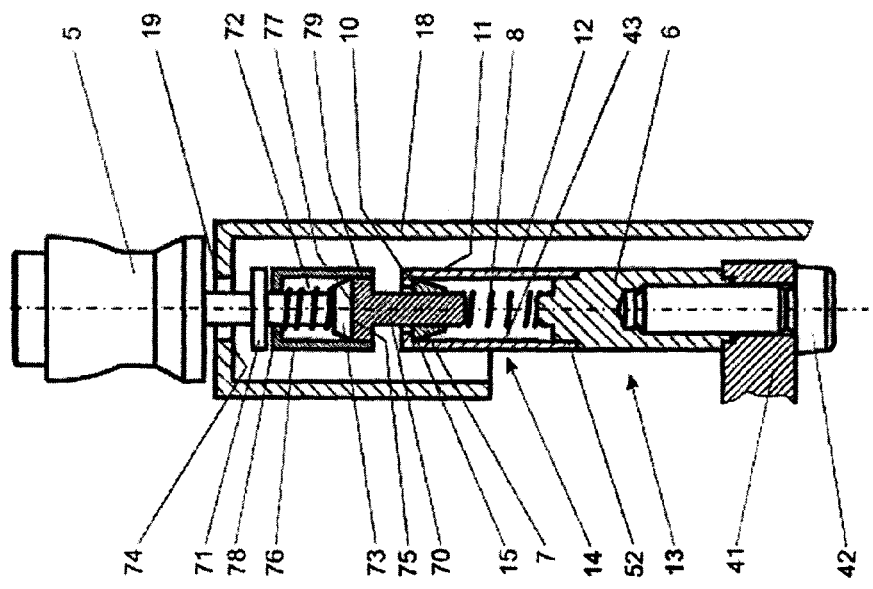
FIG. 6 is a cross-sectional view of an overload protection device in a fourth embodiment, which also includes the capability to uncouple tensile forces.

FIG. 6 shows a further embodiment of a force-transmitting linkage 13 with an integrated overload protection device 14 in a cross-sectional view. The design configuration of the overload protection device 14 is to a large extent analogous to the configuration of the embodiments shown in FIG. 3 and FIG. 5. In the embodiment of FIG. 6, the design and function of the load receiver 5, fixating member 6, elastic element 8, counter-stop 10, stop 11, sleeve 12, contact point 15, projection 41, fastener element 42, sleeve wall 43, and adjustment screw thread 52 are analogous to the design and function of the corresponding features in FIG. 3 and FIG. 5.

Deviating from FIG. 3 and FIG. 5, the load receiver 5 is not rigidly connected to the positioning element 7 but is guided with linear mobility relative to the positioning element 7. Opposite the stop 11, a bolt stop 82 is formed on the load receiver 5, which in the operating position is pushed into contact with the stop 11 of the positioning element 7 by the pre-tension of the spring element 72. The spring element 72 is arranged on the side of the positioning element 7 facing towards the fixating member 6, between the positioning element 7 and the spring retainer 80 that is rigidly connected to the load receiver 5. If the spring element 72, which is preferably configured as a helical compression spring, is appropriately dimensioned, it can be arranged inside the elastic element 8.

The bolt collar 71 which is rigidly connected to the load receiver 5 is constrained in its freedom of movement in all directions by the housing groove 81 that is formed on the inside of the housing part 18. When tilting moments acting on the load receiver 5, overloads acting in the load direction, or forces acting against the load direction exceed the spring forces of the elastic element 8 or the spring element 72, they are passed on through the bolt collar 71, and in the case of tilting moments possibly also through the shaft of the load receiver 5, to the housing part 18 rather than being transmitted to the weighing cell. The constraint referred to as housing groove 81 is not limited to the form of a ring groove but applies to any concave shape of whatever cross-section that is suitable to interact with the bolt collar 71 in the manner just described. Also, the configuration of the bolt collar 71 is not limited to a ring shape but includes any projections formed on the load receiver 5 that are suitable to interact with the housing groove 81. Of course, the concave shape referred to as housing groove 81 could also be formed on the load receiver 5, and the projection referred to as bolt collar 71 could also be formed on the housing part 18. Additionally, the bolt collar 71 and the housing groove 81 can be configured in such a way that torques caused by forces meeting the load receiver 5 tangentially can be absorbed through the housing part 18, so that the bolt collar 71 and the housing groove 81 form a rotation constraint.

Figure 7:
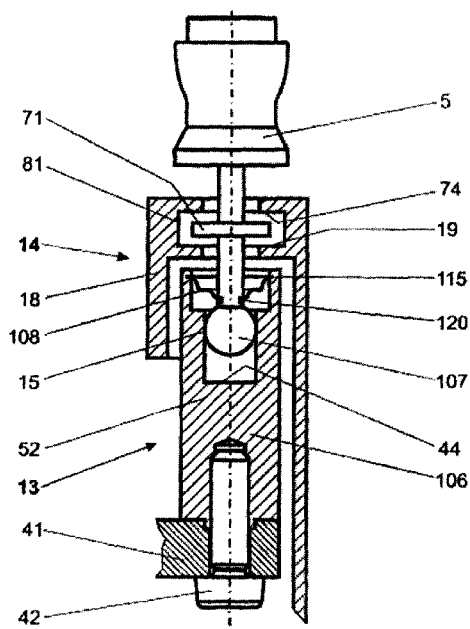
FIG. 7 is a cross-sectional view of an overload protection device in a fifth embodiment, which also includes the capability to uncouple tensile forces, with a combination elastic element/spring element.

FIG. 7 shows a design configuration similar to FIG. 6, wherein the load receiver 5, contact point 15, housing part 18, projection 41, fastener element 42, bolt collar 71, and the housing groove 81 are analogous in their form and function to the corresponding features in FIG. 6. As in the FIGS. 3 to 6 of the foregoing description, the load receiver is positioned without play in two dimensions by the positioning element 107 which in this case has a spherical shape. In contrast to the positioning element 7 of FIG. 6, there is no stop in the third dimension which corresponds to the load direction. The position relative to the load direction and against the load direction is secured by the elastic element 108. The latter can have the same shape as the positioning elements that have elastic properties and performs its securing function by having a first connecting area 115, for example the outer border portion of a diaphragm, connected rigidly to the fixating member 106 and by having a second connecting area 120, for example the border of the diaphragm hole, connected rigidly to the load receiver 5. When a load is placed on the load receiver 5, the load receiver 5 will therefore descend into the bore hole of the fixating member 106 by an amount that depends on the magnitude of the load and the elasticity of the elastic element 108, without coming into contact with the bottom 44 of the bore hole. The elastic element 108 does not necessarily have to be a diaphragm; different elements are likewise conceivable, such as a conically wound spiral spring or helical compression spring, or sheet metal strips distributed over the circumference of the load receiver 5 and performing the same function. The fixating member 106 does not necessarily have to be of a monolithic design, it could also comprise the fixating part and a sleeve. The functions of limiting the displacement, tilting, and in some cases the rotation, of the load receiver 5 are performed by the elements that are described in detail in the context of FIG. 6, i.e., the bolt collar 71 and the housing groove 81.

Figure 8:
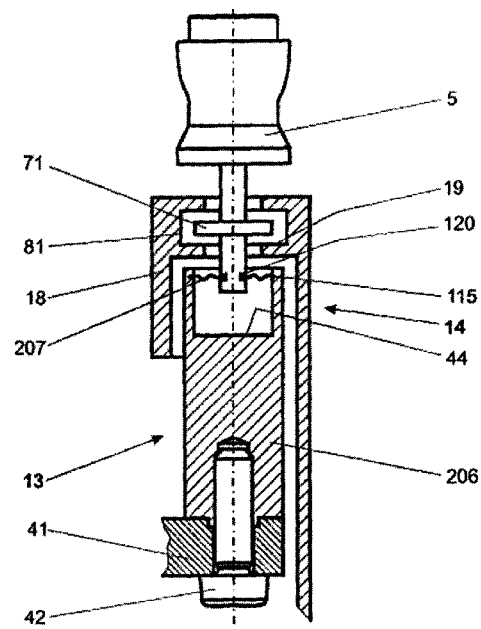
FIG. 8 is a cross-sectional view of an overload protection device in a sixth embodiment, which also includes the capability to uncouple tensile forces, with a combination elastic element/spring element/positioning element.

FIG. 8, in turn, represents a design configuration similar to FIG. 7, wherein the load receiver 5, housing part 18, projection 41, fastener element 42, bolt collar 71, and the housing groove 81 are analogous in their form and function to the corresponding features in FIG. 7. In contrast to FIG. 6, the function of positioning the load receiver 5 relative to the fixating member 206 is performed in all three dimensions by the elastically configured positioning element 207, which performs its securing function by having a first connecting area 115, for example the outer border portion of a diaphragm, connected rigidly to the fixating member 206 and by having a second connecting area 120, for example the border of the diaphragm hole, connected rigidly to the load receiver 5. As described above in the context of FIG. 7, when a load is placed on the load receiver 5, the load receiver 5 will descend into the bore hole of the fixating member 206 by an amount that depends on the magnitude of the load and the elasticity of the positioning element 207, without coming into contact with the bottom 44 of the bore hole. The positioning element 207 does not necessarily have to be a diaphragm; different elements are likewise conceivable, such as a conically wound spiral spring or helical compression spring, a cylindrical compressive coil spring, or sheet metal strips distributed over the circumference of the load receiver 5 and performing the same function. The functions of limiting the displacement, tilting, and in some cases the rotation, of the load receiver 5 are performed by the elements that are described in detail in the context of FIG. 6, i.e., the bolt collar 71 and the housing groove 81.

Figure 9A:
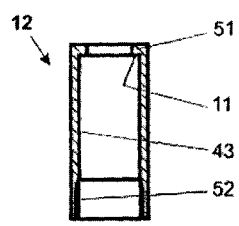
FIG. 9 depicts the sleeve shown in cross-sectional or perspective view, with the parts a) to c) of the drawing showing different variations.
Figure 9B:
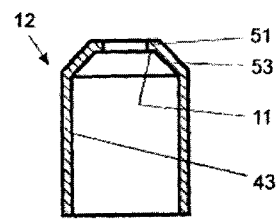
Figure 9C:
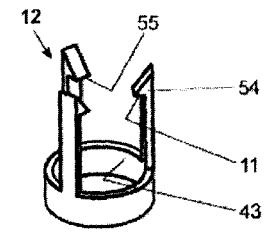

FIG. 9 represents a variety of possible designs of sleeves 12, without excluding other design concepts. The illustrated sleeves 12 have in common that each has at least three precisely defined areas of contact with the positioning element (not shown) in the radial as well as axial directions. As a result, the sleeves 12 position the load receiver very precisely in relation to the fixating member and with an appropriate design, the load receiver will return to its original position every time it has been tilted. FIG. 9a shows a cross-sectional view of a sleeve 12. At the upper end of the rotationally symmetric sleeve 12, an inward-directed flange 51 is formed which provides the stop 11. In the bottom portion of the sleeve 12, a thread 52 is formed which serves to adjust the elastic element and rigidly connects the sleeve 12 to the fixating member (not shown). The thread 52 is not an indispensable part of the sleeve 12, as the rigid connection between the fixating member and the sleeve 12 can also be achieved through a press fit, a pin connection or analogous methods of connection, including non-releasable connections. Furthermore, depending on the design of the fixating member, the thread 52 can also be arranged on the outside of the sleeve 12. FIG. 9b presents a cross-sectional view of a sleeve 12 whose top portion 53 is tapered down in the upward direction and terminates in an inward-directed flange 51. This design of the sleeve 12 allows a larger tilt angle of the load receiver. With this sleeve shape, it is also possible to use a cylindrical positioning element analogous to FIG. 10b. Of course, the bottom portion of the sleeve 12 does not necessarily have to be cylindrical but can also have an arbitrary cross-sectional shape in the radial and/or axial direction as long as the selected shape provides the necessary clearance space for the tilting. FIG. 9c represents a sleeve 12 which has the required properties in regard to the guiding and positioning of the positioning element (not shown) and whose mass has been reduced so that it only has three upward-directed detent fingers 54. A sleeve 12 of this design can be formed directly on the fixating member, as the detent fingers 54 are pushed apart by the positioning element when the latter is inserted from above, and as soon as the largest diameter of the positioning element has cleared the detent corners 55, the detent fingers 54 will spring back. With this design of the sleeve 12, it is practical to use rotationally symmetric positioning elements. A sleeve 12 of this design can also be used to allow a non-complicated and quick exchange of a load receiver by unsnapping the positioning element of the current load receiver and snapping the new load receiver into place.

Figure 10A:
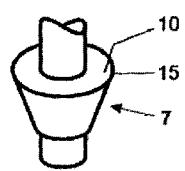
FIG. 10 depicts the positioning element, with the parts a) to c) of the drawing showing different variations.
Figure 10B:
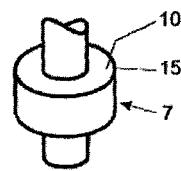
Figure 10C:
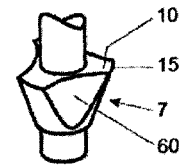

FIG. 10 illustrates a variety of possible designs for the positioning element 7. All of the FIGS. 10a to 10c show the contact areas 15 which interact with the sleeve and also show the counter-stop 10. FIG. 10a shows a rotationally symmetric positioning element 7 in which the side that faces away from the counter-stop 10 has a frusto-conical shape. This positioning element 7 can be used in all of the sleeves shown in FIG. 9. FIG. 10b illustrates a cylindrical positioning element 7. A positioning element 7 of this shape can be used only in sleeves that are shaped analogous to the sleeve of FIG. 9b and provide the required clearance space to allow the tilting of the positioning element 7. FIG. 10c shows a positioning element 7 in which the design of FIG. 10a has been supplemented with additional cutbacks 60 which subdivide the counter-stop 10 and reduce the contact locations 15 with the inside sleeve wall to three. Of course, the number of the cutbacks 60 and thus the number of the contact locations 15 with the inside sleeve wall and of the number of subdivisions of the counter-stop 10 can be freely selected. A positioning element 7 of this design is generically unsuited for being used with a sleeve according to FIG. 9c.

Figure 11A:
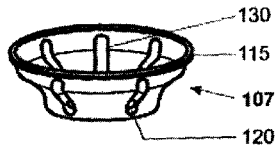
FIG. 11 depicts the positioning element with elastic properties, with the parts a) and b) of the drawing showing different variations.
Figure 11B:
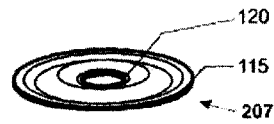

FIG. 11 represents different possible designs for positioning elements 107, 207 with elastic properties, wherein the versions of FIG. 11a as well as FIG. 11b incorporate the first connecting area 115 and the second connecting area 120.

FIG. 11a illustrates a rotationally symmetric positioning element 107 whose first connecting area 115 is rigidly connected to the fixating member 106, 206 (not shown) and whose second connecting area 120 is rigidly connected to the load receiver 5 (not shown). The positioning element 107 can furthermore be perforated by one or more slots 130, where the latter can extend radially or also in a spiral pattern from the center towards the outside. The positioning element 107 which is configured as a cup-shaped diaphragm can also be designed as a ring-shaped, planar diaphragm. A single-helix or multi-helix coil spring which can take up compressive, bending and tensile loads represents a special embodiment of this kind of a positioning element 107. In this case, the first connecting area 115 and the second connecting area 120 lie exactly above one another. A triple-helix coil compression spring whose helix windings are staggered by 120° relative to each other is distinguished by a particularly good shape-holding stability. FIG. 10b shows a rotationally symmetric positioning element 207 whose first connecting area 115 is rigidly connected to the fixating member 106, 206 (not shown) and whose second connecting area 120 is rigidly connected to the load receiver 5 (not shown). The positioning element 207 which is configured as a ring-shaped diaphragm has a coaxial wave pattern towards its center, but depending on the modulus of elasticity of the material and on the desired degree of stiffness, the positioning element 207 can also be a flat disk.

As is self-evident, the installation of an overload protection device according to the invention is not limited to a weighing cell with a force-transmitting device in the form of a material block whose material portions are separated from each other by material-free spaces in the form of narrow linear cuts that traverse the material block perpendicular to its largest side surface. For the load receiver with an overload protection device in which a torque safety device is integrated, one could also envisage other design configurations which could be installed on a weighing cell with a material block whose material-free spaces are generated by milling. It is likewise possible to connect a precisely position-maintaining overload protection device according to the invention to a strain gauge load cell or other weighing cells that are based on the principle of electromagnetic force compensation. It is understood that these weighing cells are not limited in their application to weighing modules, but that they can be used in all known measuring instruments that serve to determine the mass of a weighing object.

What is claimed is:

1. A weighing module with a weighing cell having a load-receiving portion and a stationary portion, the weighing module further comprising: a load receiver; an overload protection device that is arranged between the load receiver and the load-receiving portion, the overload protection device serving to protect the weighing cell from being overloaded by static and dynamic forces; and a positioning element that positions the load receiver free of play relative to the load-receiving portion, at least in a plane that is orthogonal to the load direction, wherein the load receiver is adapted to react to forces acting upon it by displacement relative to the load-receiving portion, either in the same direction as the load or in both the same as well as the opposite direction of the load, and wherein the load receiver is adapted to react to forces acting upon it at a right angle to the load direction by tipping in all directions, as allowed by an exemption formed between the positioning element and the load-receiving portion.

2. The weighing module of claim 1, further comprising: a sleeve that guides the load receiver free of play in the load direction, relative to the load-receiving portion and the positioning element; and an elastic element that positions the load receiver with a pre-tension against a stop; such that the load receiver is displaceable in the load direction and is tiltable in all directions orthogonal to the load direction when forces in excess of the pre-tension act thereupon.

3. The weighing module of claim 2, further comprising: a fixating member, firmly connected to the load-receiving portion and rigidly connected to the sleeve, wherein the positioning element is rigidly attached to the load receiver.

4. The weighing module of claim 2, further comprising: a fixating member, firmly connected to the load-receiving portion and rigidly connected to the positioning element, wherein the sleeve is rigidly attached to the load receiver.

5. The weighing module of claim 2, wherein: the stop is formed on the inside of the sleeve; the stop forms a ring-shaped surface or line lying orthogonal to the load direction; a counter-stop, belonging to the positioning element and directed against the stop, has at least three resting points; and the positioning element has a radial dimension in the area of at least three contact points with an inside wall of the sleeve that is substantially equal to a radial dimension of the sleeve at the contact points.

6. The weighing module of claim 3, wherein: the connection between the sleeve and the fixating member is configured to be axially adjustable and securable to allow the spring force of the elastic element to be adjusted against the fixating member.

7. The weighing module of claim 5, wherein the positioning element has a frusto-conical shape with the at least three resting points of the counter-stop being arranged at a base of the frusto-cone.

8. The weighing module of claim 7, wherein the positioning element has elastic properties.

9. The weighing module of claim 7, wherein the at least three resting points lie on a circular surface or a circular ring surface.

10. The weighing module of claim 9, wherein the elastic element is a compressive helix spring.

11. The weighing module of claim 10, wherein the positioning element, the elastic element and the sleeve each has a central longitudinal axis that runs in the direction in which the force is introduced into the weighing cell, and the axes coincide, at least when the load receiver is in an operating position.

12. The weighing module of claim 11, further comprising: a floor part, having a housing part rigidly connected thereto; and at least one housing stop or a housing groove, formed on the housing part, wherein the at least one housing stop and housing groove limit the tilting movement of the load receiver and the displacement in load direction or the displacement in the same direction as well as opposite direction of the load by interacting with either a contour of the load receiver or with a bolt collar formed on the load receiver.

13. The weighing module of claim 12, further comprising: a rotation constraint, protecting the load receiver against excessive forces meeting the load receiver at a right angle to the load direction, the rotation constraint acting in particular tangentially on the load receiver, and a housing-connected recess, wherein the rotation constraint engages the housing-connected recess.

14. The weighing module of claim 12, further comprising: a bolt collar protecting the load receiver against excessive forces meeting the load receiver at a right angle to the load direction, the bolt collar acting in particular tangentially on the load receiver; and a housing-connected groove, wherein the bolt collar engages the housing-connected groove.

15. The weighing module of claim 12, further comprising: at least one fastening area, connected to the stationary portion, for attachment to a weighing module support, the at least one fastening area having a positioning device with a central longitudinal axis that coincides with the central longitudinal axis of the overload protection device, the central longitudinal axis of the load receiver, or both.

16. The weighing module of claim 15, further comprising: a raised seating pad associated with each at least one fastening area.

17. The weighing module of claim 16, wherein the positioning device comprises at least one form-fitting pin.

18. An arrangement for simultaneously weighing a plurality of objects of the same kind in a predetermined two-dimensional layout, the arrangement comprising: a plurality of the weighing modules of claim 1, wherein the plurality of load receivers associated therewith are arranged relative to each other in a two-dimensional layout corresponding to the two-dimensional arrangement of the objects and each load receiver is connected to a corresponding weighing cell.

19. The weighing module of claim 1, further comprising: a sleeve; and a fixating member, firmly connected to the load-receiving portion and rigidly connected to the sleeve, wherein the positioning element is rigidly attached to the load receiver.

20. The weighing module of claim 19, wherein: the connection between the sleeve and the fixating member is configured to be axially adjustable and securable to allow the spring force of the elastic element to be adjusted against the fixating member.

21. The weighing module of claim 4, wherein: the connection between the sleeve and the load receiver is configured to be axially adjustable and securable to allow the spring force of the elastic element to be adjusted against the load receiver.

22. The weighing module of claim 6, wherein the positioning element has a frusto-conical shape with the at least three resting points of the counter-stop being arranged at a base of the frusto-cone.

23. The weighing module of claim 1, wherein the positioning element has elastic properties.

24. The weighing module of claim 5, wherein the at least three resting points lie on a circular surface or a circular ring surface.

25. The weighing module of claim 2, wherein the elastic element is a compressive helix spring.

26. The weighing module of claim 19, wherein the positioning element and the sleeve each has a central longitudinal axis that runs in the direction in which the force is introduced into the weighing cell, and the axes coincide, at least when the load receiver is in an operating position.

27. The weighing module of claim 1, further comprising: a floor part, having a housing part rigidly connected thereto; and at least one housing stop or a housing groove, formed on the housing part, wherein the at least one housing stop and housing groove limit the tilting movement of the load receiver and the displacement in load direction or the displacement in the same direction as well as opposite direction of the load by interacting with either a contour of the load receiver or with a bolt collar formed on the load receiver.

28. The weighing module of claim 1, further comprising: a rotation constraint, protecting the load receiver against excessive forces meeting the load receiver at a right angle to the load direction, the rotation constraint acting in particular tangentially on the load receiver, and a housing-connected recess, wherein the rotation constraint engages the housing-connected recess.

29. The weighing module of claim 1, further comprising: a bolt collar protecting the load receiver against excessive forces meeting the load receiver at a right angle to the load direction, the bolt collar acting in particular tangentially on the load receiver, and a housing-connected groove, wherein the bolt collar engages the housing-connected groove.

30. The weighing module of claim 15, wherein the positioning device comprises at least one form-fitting pin.

* * * * *